(12) United States Patent
Park et al.

(10) Patent No.: US 7,441,417 B2
(45) Date of Patent: Oct. 28, 2008

(54) OUTSIDE VAPOR DEPOSITION APPARATUS FOR MAKING OPTICAL FIBER PREFORM

(75) Inventors: Chan-Yong Park, Seoul (KR); Bong-Hoon Lee, Gyeonggi-do (KR)

(73) Assignee: LS Cable Ltd., Seoul (KR)

( * ) Notice: Subject to any disclaimer, the term of this patent is extended or adjusted under 35 U.S.C. 154(b) by 268 days.

(21) Appl. No.: 10/489,438

(22) PCT Filed: Mar. 27, 2003

(86) PCT No.: PCT/KR03/00615

§ 371 (c)(1),
(2), (4) Date: Mar. 9, 2004

(87) PCT Pub. No.: WO2004/002911

PCT Pub. Date: Jan. 8, 2004

(65) Prior Publication Data

US 2004/0244426 A1      Dec. 9, 2004

(30) Foreign Application Priority Data

Jun. 28, 2002    (KR) .................. 10-2002-0037090

(51) Int. Cl.
   *C03B 37/018*    (2006.01)
(52) U.S. Cl. ................................ 65/421; 65/413
(58) Field of Classification Search .............. 65/413
   See application file for complete search history.

(56) References Cited

U.S. PATENT DOCUMENTS

| | | | | |
|---|---|---|---|---|
| 3,947,233 A | | 3/1976 | Sundberg | 431/328 |
| 4,126,560 A | * | 11/1978 | Marcus et al. | 210/489 |
| 4,136,828 A | | 1/1979 | Anderson et al. | 239/422 |
| 4,403,947 A | * | 9/1983 | Spielman | 431/353 |
| 4,486,212 A | | 12/1984 | Berkey | 65/2 |
| 4,682,994 A | * | 7/1987 | Mansfield | 65/421 |
| 6,047,564 A | | 4/2000 | Schaper et al. | 65/17.4 |
| 6,474,106 B1 | | 11/2002 | Crossland et al. | 65/377 |
| 6,837,076 B2 | * | 1/2005 | Hawtof | 65/413 |
| 2002/0081377 A1 | * | 6/2002 | Ohishi et al. | 427/163.2 |

(Continued)

FOREIGN PATENT DOCUMENTS

JP          57-173291       10/1982

(Continued)

OTHER PUBLICATIONS

Supplemental European Search Report in EP03710495, Jul. 8, 2004.

*Primary Examiner*—Steven P. Griffin
*Assistant Examiner*—Queenie Dehghan
(74) *Attorney, Agent, or Firm*—Jones Day

(57) ABSTRACT

An Outside Vapor Deposition (OVD) apparatus for making an optical fiber preform with uniform deposition of silica particles through uniform heating to the overall length of the preform includes a mandrel having a predetermined length and driven to rotate and a burner for emitting a combustion gas together with a combustion gas toward the mandrel and burning the combustion gas to make silica particles to that the silica particles are deposited on a surface of the mandrel, wherein the burner has a length corresponding to the length of the mandrel and provides uniform temperature throughout the overall length of the mandrel at the same time.

6 Claims, 6 Drawing Sheets

U.S. PATENT DOCUMENTS

2004/0261460 A1 * 12/2004 Roba et al. .................... 65/413

FOREIGN PATENT DOCUMENTS

| | | |
|---|---|---|
| JP | 59-64539 | 4/1984 |
| JP | 60-155539 | 8/1985 |
| JP | 01-248781 | 9/1989 |
| JP | 03-112820 | 5/1991 |
| JP | 03-279234 | 12/1991 |
| JP | 5-17164 | 1/1993 |
| JP | 10-7429 | 1/1998 |
| JP | 2001-48550 | 2/2001 |
| JP | 2001-064031 | 3/2001 |
| JP | 2001-199729 | 7/2001 |
| KR | 93-7835 | 5/1993 |
| WO | PCT/US98/25608 | 12/1998 |
| WO | WO 99/32410 | 7/1999 |
| WO | WO 01/79126 | 10/2001 |
| WO | WO 02/28790 | 4/2002 |

* cited by examiner

OUTSIDE VAPOR DEPOSITION APPARATUS FOR MAKING OPTICAL FIBER PREFORM

TECHNICAL FIELD

The present invention relates to an Outside Vapor Deposition (OVD) apparatus for making an optical fiber preform and a method for making an optical fiber preform using the apparatus, and more particularly to an OVD apparatus which enables uniform deposition of material particles constituting an optical fiber preform over the length of the preform by using a burner having an improved structure and a method for making an optical fiber preform using the apparatus.

BACKGROUND ART

An Outside Vapor Deposition (OVD) device is broadly used for making an optical fiber preform since it may give a bigger-diameter preform with high deposition efficiency.

An example of the conventional OVD device is schematically shown in FIG. 1. Referring to FIG. 1, the conventional OVD device includes a cylindrical burner 12 mounted upon a plate 10, and a mandrel 18 mounted above the burner 12 to rotate in a predetermined direction. While the OVD process is conducted, material particles constituting an optical fiber preform 16 are deposited on the mandrel 18. In the OVD process, the cylindrical burner 12 supplied with combustion gas and reaction gas emits flame 14 toward the mandrel 18 in order to cause a high temperature state thereto, and it is also reciprocated in the horizontal direction. This process causes generation of fine particles of the material constituting the optical fiber preform, and the generated particles are deposited on the surface of the mandrel 18 in a predetermined thickness.

More specifically, combustion gases such as $H_2$ and $O_2$ and reaction gases such as $SiCl_4$ and $GeCl_4$ are supplied to the cylindrical burner 12 at a predetermined flow rate. Then, combustion reaction of the combustion gases causes a high temperature state, and material particles such as $SiO_2$ and $GeO_2$ are generated. The generated particles are deposited on the surface of the rotating mandrel 18 in a predetermined thickness.

The material particles such as $SiO_2$ and $GeO_2$ are generated when the reaction gases are hydrolyzed with a burning product $H_2O$ or directly oxidized at or above 1100° C. with a carrier gas $O_2$ formed by the burner 12 according to the chemical reaction formula expressed below. The fine particles of $SiO_2$ and $GeO_2$ collide into each other and condense into particles with a diameter of about 0.2 μm, and are deposited on the surface of the rotating mandrel 18.

Chemical Reaction Formula 1

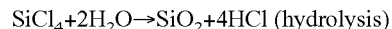
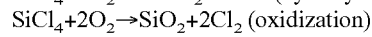

$SiCl_4 + 2H_2O \rightarrow SiO_2 + 4HCl$ (hydrolysis)
$SiCl_4 + 2O_2 \rightarrow SiO_2 + 2Cl_2$ (oxidization)

The deposition mechanism of the fine material particles constituting the optical fiber preform in the optical fiber preform manufacturing process using the OVD device is thermophoresis. Thermophoresis means that, when fine particles exist in a gas having a temperature gradient, the particles move from a high temperature area to a low temperature area due to the momentum exchange between particles and gas molecules. The rate of the thermophoresis is calculated according to the following Mathematical Equation 1.

$$V_t = -(Kv/T)\Delta T \quad \text{Mathematical Equation 1}$$

Here, K is a thermophoresis constant.

As shown in the above Mathematical Equation 1, it will be known that the temperature gradient is a main factor to the particle deposition in the optical fiber preform making process using the OVD device. In other words, the combustion of hydrogen and oxygen emitted from the burner 12 makes the reaction gas be oxidized and the reaction gas by hydrolyzed by the flame near the burner 12 to form fine material particles constituting the optical fiber preform 16, and these particles move together with hot gases emitted from the burner 12 and pass around the mandrel 18. These particles are then deposited to the mandrel 18 having a relatively low temperature due to the effect of temperature gradient. Thus, the particle deposition efficiency is increased as the particle has higher temperature and the mandrel 18 has lower temperature.

In the OVD process, whenever moving on the plate 10, the cylindrical burner 12 changes compositions of $SiCl_4$ and $GeCl_4$ so that the optical fiber preform 16 may obtain a desired refractive index, in the general OVD process. In addition, the mandrel 18 is separated and removed from the preform 16 when the preform 16 has a desired deposition thickness. This preform 16 is then dried and sintered in a furnace which is maintained at a temperature of 1400~1600° C., so as to make an optical fiber preform.

When executing the OVD process, one or multiple burners 12 are arranged in series, and then the burner(s) 12 or the mandrel 18 is moved laterally. It is because the burner 12 used in the conventional OVD process has a cylindrical shape as shown in FIG. 2, and thus heats just a local area of the optical fiber preform 16, as shown in FIG. 2.

On the other hand, FIG. 4 shows planar distribution of the flame 14 generated by the conventional cylindrical burner 12 equipped in the conventional OVD device. Referring to FIG. 4, it may be understood that the flame 14 is more focused in the center of the burner 12. In the planar distribution of FIG. 4, darker area shows that the flame 14 is more concentrated. Accordingly, the material particles deposited on the mandrel 18 by the conventional cylindrical burner 12 have a density gradient in a radial direction. This fact is also proven by FIG. 3 which shows soot particle density in X- and Y-direction.

If the material particles of the optical fiber preform 16 are deposited on the rotating mandrel 18 with laterally moving the burner 12, a spiral deposition pattern 19 is created on the surface of the mandrel 18, as shown in FIG. 5. This spiral deposition pattern 19 makes a deposition layer of a certain thickness whenever the burner 12 passes, and such deposition layers are stacked to form the optical fiber preform 16. However, due to the above-mentioned spiral deposition pattern 19, portions having a high soot density are overlapped at a certain position, and there are also generated non-overlapped portions on the mandrel 18. Thus, the overlapped portion 19a becomes relatively thicker, and the preform may hardly obtain a uniform thickness all over the length. In addition, rapid transfer of the burner 12 or the preform 16 may cause turbulence to a laminar flow of the flame, so there is a limit in improving the deposition efficiency. Moreover, ends of the optical fiber preform 16 cannot be used because of irregularity of the particle stream, thus causing losses.

The difference of the soot density may cause irregularity of the deposited thickness, and such irregular deposition may cause overlaps. Such overlaps become a factor limiting a deposition speed, a deposition amount and a deposition density as the optical fiber preform 16 increases, and eventually form ripples on an outer circumference of the finished optical fiber preform 16 after the sintering process. The ripples formed on the surface of the optical fiber preform 16 cause inferiority in the frequency blocking characteristic and the distribution characteristic which are sensitive to the core diameter, so the ripples should be removed.

To solve such a problem, there is proposed U.S. Pat. No. 4,486,212 entitled "Devitrification Resistance Flame Hydrolysis Process". This document discloses a technique to guide silica particles to be uniformly deposited on the mandrel by decreasing an initial deposition speed to a very low level. Although the patented method may restrain the amplification of the irregular deposition to some extent, but it cannot solve the above problem completely. As disclosed in Korean Patent Filing No.92-19778, this technique cannot overcome the drawback that a loss at both ends of the optical fiber preform reaches 20% due to reciprocation of the burner or preform, and the control of deposition is difficult. In addition, the above conventional techniques cannot solve problems derived from the spiral deposition pattern generated after the initial deposition, and inevitably leads to lower productivity caused by the initial deposition control.

In addition, U.S. Pat. No. 4,683,994 entitled "Process and Apparatus for Forming Optical Fiber Preform" suggests a technique using a large-scale soot generator which cover all area of the optical fiber preform. However, when using the method proposed in the above document, gases are mixed inside the soot generator, so problems such as soot growth and clogging of nozzles due to the grown soot arise. In addition, since the overall optical fiber preform gets increased temperature, the particle deposition efficiency using the thermophoresis is even decreased.

DISCLOSURE OF THE INVENTION

The present invention is designed to overcome the above problems of the prior art, therefore an object of the invention is to provide an Outside Vapor Deposition (OVD) apparatus for making an optical fiber preform, which employs a straight burner having a length equal or similar to an optical fiber preform to deposit material particles of the optical fiber preform on the surface of the preform, thereby reducing deposition time without a spiral deposition pattern and dramatically improving the deposition efficiency. Another object of the present invention is to provide a method for making an optical fiber preform using the apparatus.

In order to accomplish the above object, the present invention provides an Outside Vapor Deposition (OVD) apparatus for making an optical fiber preform, which includes a mandrel having a predetermined length and is capable of rotation; and a burner for emitting predetermined reaction gas together with combustion gas toward the mandrel to generate particles of an optical fiber preform so that the material particles are deposited on a surface of the mandrel to form the optical fiber preform, wherein the burner has a length corresponding to the mandrel and provides uniform temperature throughout the overall length of the mandrel at the same time.

Preferably, a flame generated by the burner is substantially focused toward the central axis of the mandrel along all length of the mandrel.

In addition, it is also preferred that the burner has a plurality of chambers connected to different gas supply lines in order to emit the combustion gas and the reaction gas independently. The chamber may be composed of a gas spreading channel, and the gas spreading channel preferably has a section which becomes substantially wider from a gas input portion to a gas output portion. A filter may be provided at the gas output portion of the gas spreading channel so as to disperse gas pressure in the gas spreading channel. In this case, the filter preferably has a pore size in the range of 50~150 μm.

In the OVD apparatus of the present invention, the gas supplying line preferably supplies the combustion gas and the reaction gas independently into the chamber.

In another aspect of the present invention, there is also provided a method for making an optical fiber preform using an Outside Vapor Deposition (OVD) apparatus, which includes the steps of: preparing a mandrel having a predetermined length and a burner having a length corresponding to the mandrel; rotating the mandrel at a certain speed; emitting predetermined reaction gas and combustion gas toward the mandrel through the burner so as to provide a flame having the same temperature throughout overall length of the burner and cause generation of material particles of an optical fiber preform so that the material particles are deposited on the overall length of the mandrel at the same time; and depositing the material particles of the optical fiber preform to a predetermined thickness, and then removing the mandrel to obtain the optical fiber preform.

BRIEF DESCRIPTION OF THE DRAWINGS

These and other features, aspects, and advantages of preferred embodiments of the present invention will be more fully described in the following detailed description, taken accompanying drawings. In the drawings.

BEST MODE FOR CARRYING OUT THE INVENTION

Hereinafter, preferred embodiments of the present invention will be described in detail with reference to the accompanying drawings.

Figure 1:
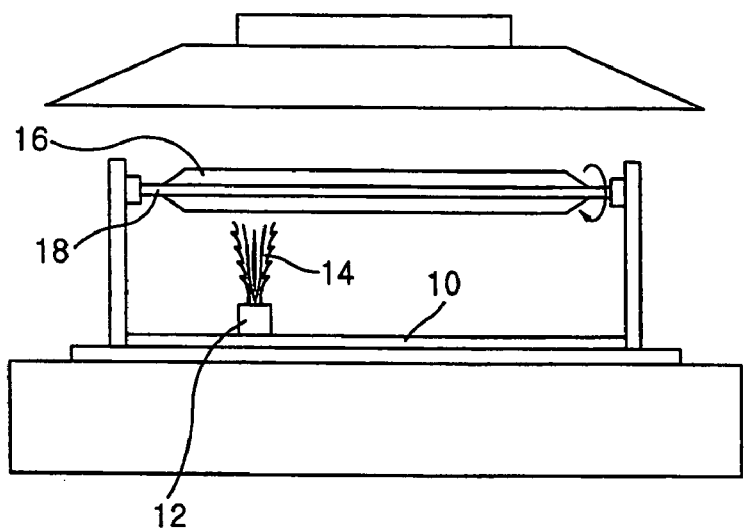
FIG. 1 is a schematic front view showing an Outside Vapor Deposition (OVD) device according to the prior art.
Figure 2:
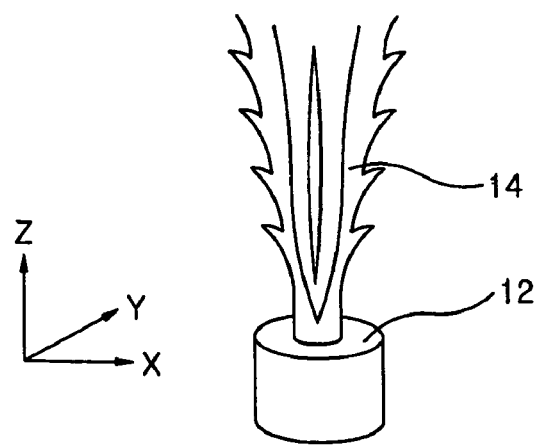
FIG. 2 shows a cylindrical burner and its flame used in the OVD device of FIG. 1.
Figure 3:
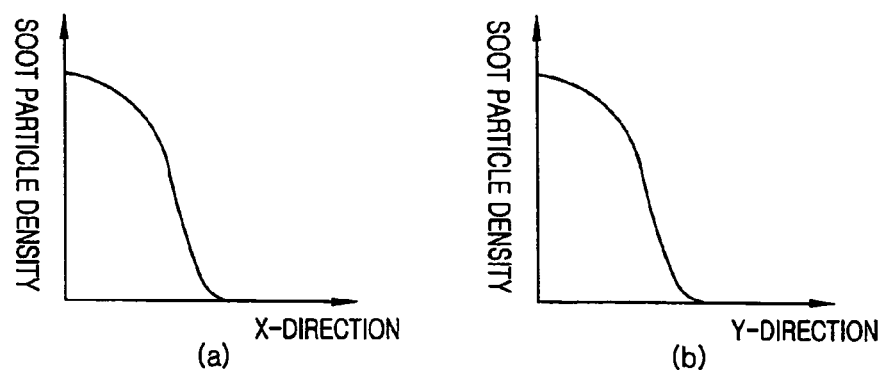
FIG. 3 shows a density graph of soot particles formed by the cylindrical burner of FIG. 2.
Figure 4:
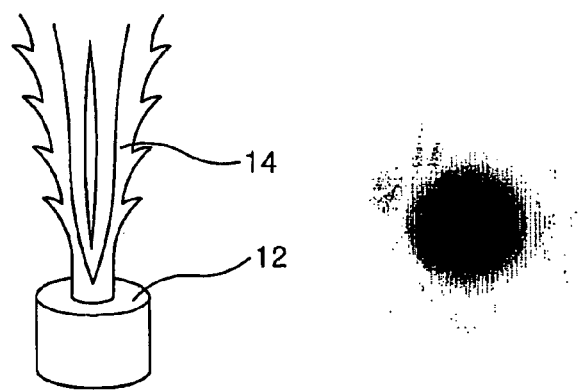
FIG. 4 shows planar distribution of the flame emitted from the cylindrical burner of FIG. 2.
Figure 5:
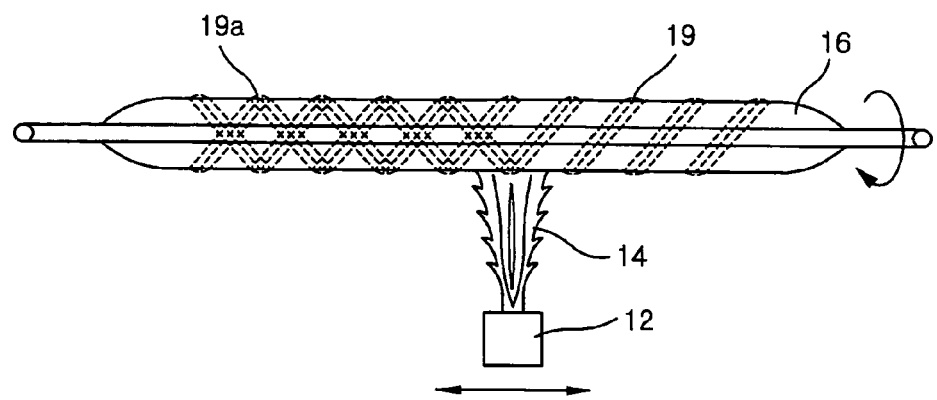
FIG. 5 shows a spiral deposition pattern generated on an optical fiber preform by the cylindrical burner of FIG. 2.
Figure 6:
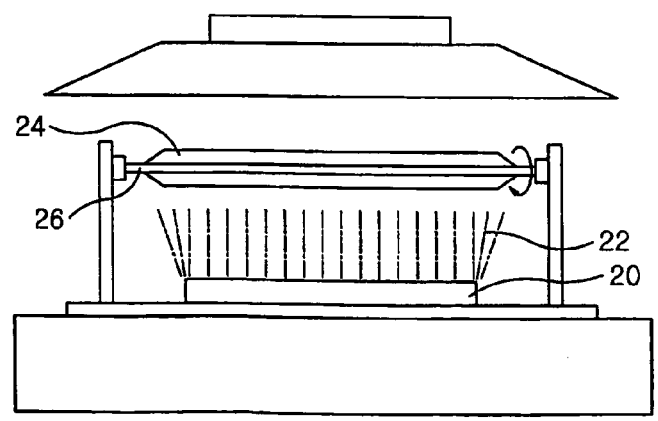
FIG. 6 is a schematic front view showing an OVD apparatus according to the present invention.

FIG. 6 schematically shows an Outside Vapor Deposition (OVD) apparatus for making an optical fiber preform according to the present invention. Referring to FIG. 6, the OVD apparatus of the present invention includes a mandrel 26 installed at a predetermined height, and a burner 20 installed below the mandrel 26. The mandrel 26 has a shape of a long rod and is connected to a driving means (not shown) for rotation.

The burner 20 has a length corresponding to the mandrel 26, preferably equal to or longer than the length of the mandrel 26.

Gas supply lines (see FIG. 10) are installed in the burner 20 so as to supply reaction gases such as $SiCl_4$ and $GeCl_4$ for generation of material particles of an optical fiber preform 24 together with combustion gases such as $H_2$ and $O_2$. In addition, the burner 20 generates material particles of the optical fiber preform 24 such as $SiO_2$ and $GeO_2$ by means of hydrolysis or oxidization, and these material particles are deposited on the surface of the rotating mandrel 26.

When the material particles of the optical fiber preform 24 are deposited on the mandrel 26 by using the burner 20, the mandrel 26 keeps rotating at a high speed so that the material particles of the optical fiber preform 24 may be uniformly deposited on the overall surface of the mandrel 26. Particularly, since the burner 20 of the present invention has a length corresponding to the mandrel 26, the material particles of the optical fiber preform 24 are uniformly deposited over the whole length of the mandrel 26.

Figure 7:
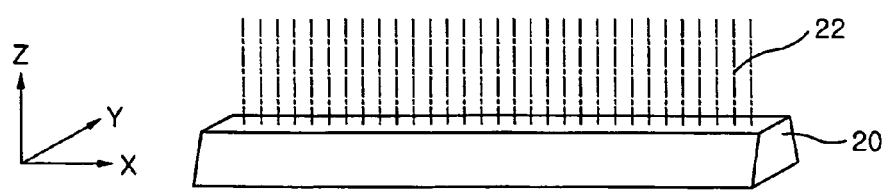
FIG. 7 shows a burner and its flame used in the OVD apparatus of the present invention.
Figure 8:
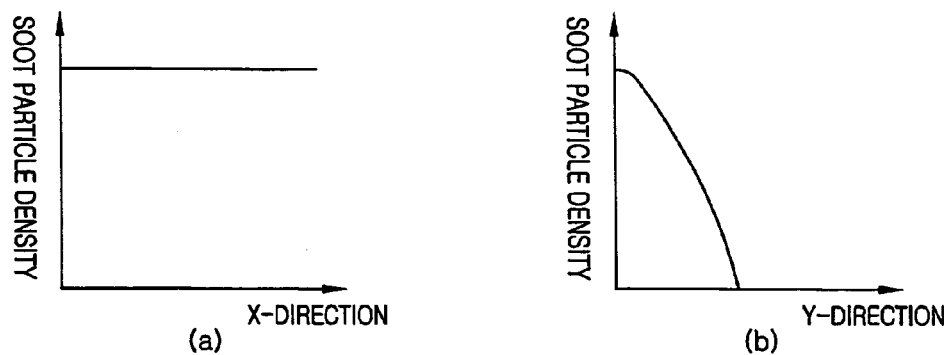
FIG. 8 shows a density graph of soot particles formed by the burner of FIG. 7.

FIG. 7 shows the burner 20 used in the present invention and its flame 22. Referring to FIG. 7, it will be easily known that the flame 22 is also uniformly formed in a straight line owing to the shape of the burner 20. Thus, a deposition density of the material particles of the optical fiber preform 24 caused by the burner 20 is distributed regular in an X axis over the whole length of a preform 24 and gradually decreases in a Y axis from the center to an outside, as shown in FIG. 8. In addition, since the mandrel 26 keeps rotating during the deposition process of the material particles of the optical fiber preform 24, the deposition density of the Y axis also becomes substantially regular on the whole circumference of the optical fiber preform 24.

Figure 9:
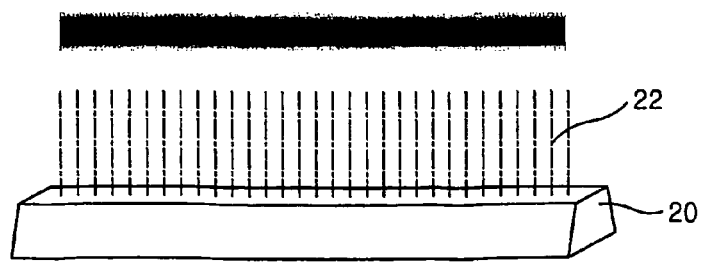
FIG. 9 shows planar distribution of the flame emitted from the burner of FIG. 7.

FIG. 9 shows a planar distribution of the flame 22 formed from the above-mentioned straight burner 20 of the present invention. In FIG. 9, darker area shows that the flame 22 is more concentrated at that portion. As would be easily known in the figure, the flame 22 gives uniform temperature along the center in a longitudinal direction of the straight burner 20.

Figure 10:
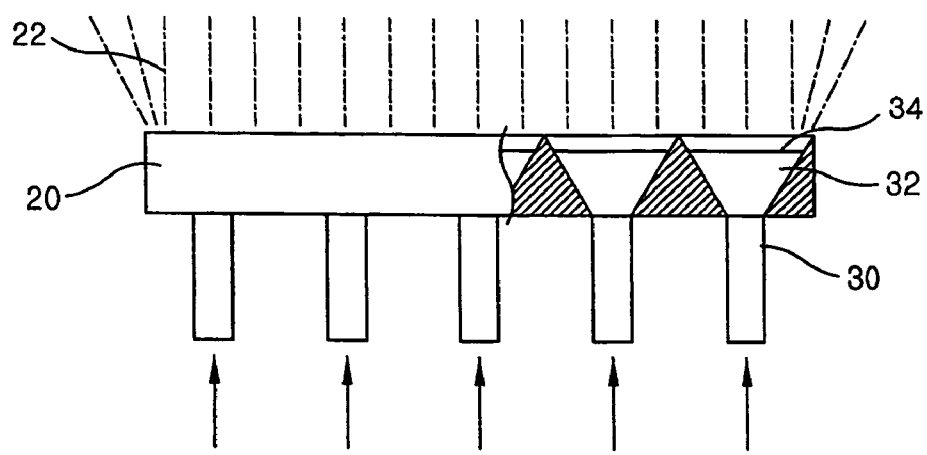
FIG. 10 is a partially-sectioned front view showing the burner of FIG. 7.

FIG. 10 is a partially sectioned view of the straight burner 20 used in the present invention. Referring to FIG. 10, the straight burner 20 of the present invention is composed of many chambers, each of which is equipped with the gas supply line 30. The gas supply line 30 is used for supplying reaction gases such as $SiCl_4$ and $GeCl_4$ together with combustion gases such as $H_2$ and $O_2$. The reaction gases and the combustion gases may be supplied through one line at the same time, or the gas supply line 30 may also be provided for the reaction gases and the combustion gases separately so that the reaction gases and the combustion gases are not mixed before chemical reaction thereof.

The gas supply lines 30 are installed with a regular space in between, and each gas supply line 30 is connected to a gas spreading channel 32. The gas spreading channel 32 forms each chamber in the burner 20 wherein an array of gas spreading channels is successively connected to each other along the direction of the mandrel's central axis. The section of the gas spreading channel becomes wider from a gas input portion to a gas output portion. Particularly, the gas output portions of the gas spreading channels 32 are preferably formed to cover the most part of an upper surface of the burner 20. In such a configuration, gases are scattered through the gas spreading channel 32 and thus lessen relatively high pressure in the gas supply line 30. In addition, the gases scattered as above are then uniformly discharged to all area above the burner 20, thereby resultantly forming a uniform temperature field along the longitudinal direction of the optical fiber preform 24. This enables uniform deposition of the material particles of the optical fiber preform 24.

A filter 34 may be installed as well to the gas output portion of the gas spreading channel 32. This filter 34 is preferably a glass filter having a pore size in the range of 50~150 μm, and this glass fiber plays a role of dispersing gas pressure in the gas spreading channel 32.

Figure 11A:
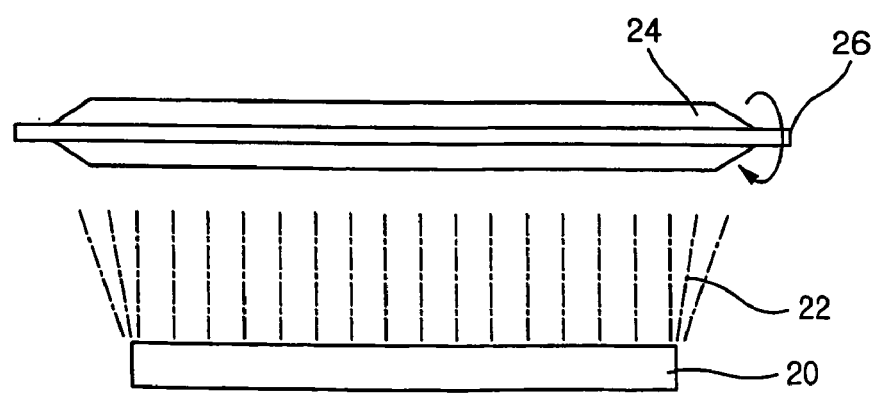
FIGS. 11a and 11b are front and side views showing the flame emitted from the burner of FIG. 7, respectively.
Figure 11B:
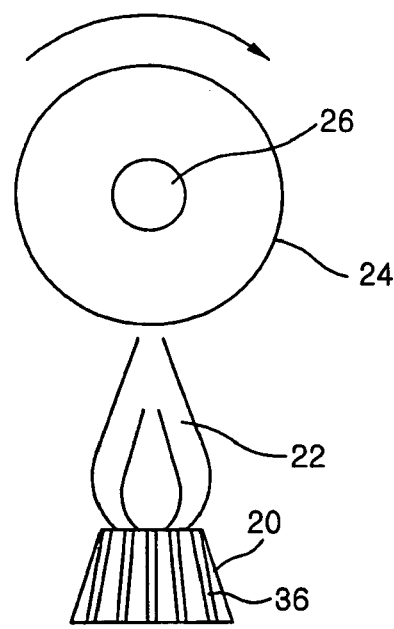

FIGS. 11a and 11b are front and side views showing the flame 22 emitted from the straight burner 20 of the present invention. Referring to the figures, it would be known that the flame 22 generated by the burner 20 is approximately uniform over the length of the optical fiber preform 24 and is focused on the center of the optical fiber preform 24 when being seen from the side. In FIG. 11b, reference numeral 36 denotes an independent flow channel, which makes input gases be supplied above the burner 20 through multiple paths. Thus, the flame 22 generated by the burner 20 is emitted through approximately overall area of the upper surface of the burner 20, and the top of the flame 22 is substantially oriented to a lower center of the optical fiber preform 24.

Figure 12:
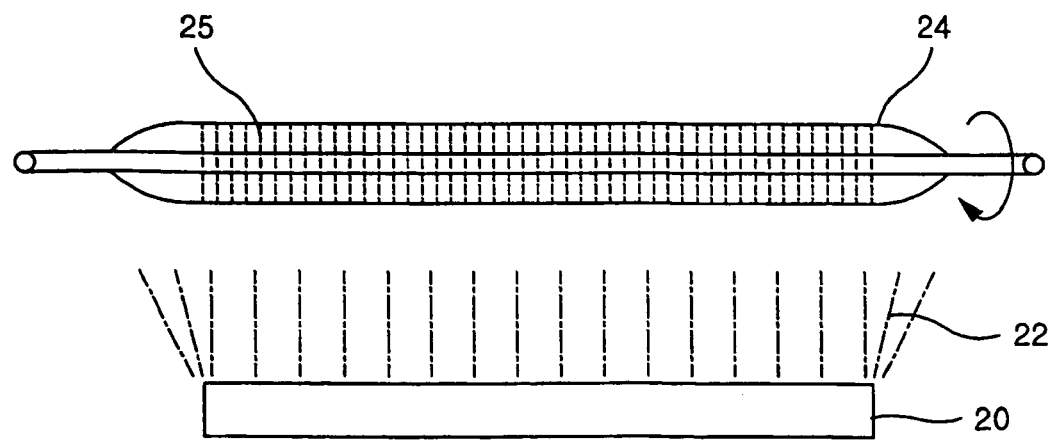
FIG. 12 shows that material particles of the optical fiber preform are deposited on the preform without any deposition pattern by using the burner of FIG. 7.

FIG. 12 shows that the material particles of the optical fiber preform 24 are uniformly deposited on the optical fiber preform 24 without any deposition pattern by using the OVD apparatus of the present invention. In the OVD apparatus of the present invention, the burner 20 or the optical fiber preform 24 does not move laterally. That is to say, the straight burner 20 makes the material particles be deposited on the whole length of the preform 24 with just keeping rotation. Thus, in the present invention, the material particles are uniformly deposited on the surface of the optical fiber preform 24 without a deposition pattern, particularly the conventional spiral pattern, and after all, the optical fiber preform 24 may obtain a uniform deposition density and a constant thickness over the whole length. In FIG. 12, reference numeral 25 denotes the material particles, which are deposited on the optical fiber preform 24.

Since the burner 20 of the present invention is designed to cover the overall length of the optical fiber preform 24, there is no need of reciprocation of the burner 20 and thus the disturbance of the flame laminar flow can be prevented. In that reason, the material particles are deposited to the whole length of the optical fiber preform 24, and thereby the optical fiber preform 24 can be deposited through all layers within a shorter time.

In addition, since the burner 20 is composed of multiple chambers, supplied amounts of the source gases can be controlled at the same rate from the outermost part to the center of the burner 20. Furthermore, the fan-shaped gas spreading channels 32 dramatically lower the local pressure of the gas, thus the gas spreading channels 32 may basically prevent the gas emitted from the gas supply lines 30 from being focused on a specific position.

Now, a method for making an optical fiber preform with the use of the OVD apparatus according to the present invention is described as follows.

To make an optical fiber preform by the use of the OVD apparatus of the present invention, the mandrel 26 having a predetermined length is installed and the burner 20 having a length corresponding to the mandrel 26 is also installed below the mandrel 26. In addition, the mandrel 26 is controlled to rotate at a constant speed by using a separate driving means.

Under such a working condition, the reaction gases such as $SiCl_4$ and $GeCl_4$ are supplied toward the mandrel 26 through the gas supply lines 30 together with the combustion gases such as $H_2$ and $O_2$. At this time, since multiple gas supply lines 30 are installed at a regular space along a longitudinal direction of the burner 20, the reaction gases and the combustion gases are uniformly supplied through the whole length of the burner 20. Furthermore, since the gas spreading channels 32 and the filters 34 are formed at the end of the gas supply lines 30, local focusing of the reaction gases and the combustion gases are basically prevented.

At this time, the burner 20 generates the flame 22 having the same temperature through the whole length thereof so as to oxidize or hydrolyze the reaction gases, and thus there are generated material particles of the optical fiber preform 24 such as $SiO_2$ and $GeO_2$. These material particles are deposited on the surface of the mandrel 26, uniformly to the whole length of the mandrel 26. In addition, since the mandrel 26 keeps rotating, the material particles are also deposited uniformly around the mandrel 26.

Such deposition of the material particles is continued until the deposition layers formed around the mandrel 26 reach a desired thickness. If obtaining a desired thickness of the silica particle deposition layer, the supply of the combustion gases and the reaction gases is stopped and the mandrel 26 quits rotation. After these processes, the mandrel 26 is removed, and then the optical fiber preform according to the OVD process is complete. This optical fiber preform 24 has a uniform thickness not only along the circumferential direction owing to the rotation of the mandrel 26 but also along the longitudinal direction since the combustion gases and the reaction gases are uniformly supplied along the longitudinal direction.

INDUSTRIAL APPLICABILITY

The OVD apparatus for making an optical fiber preform according to the present invention provides the flame of the same temperature along the overall length of the optical fiber preform at the same time. Thus, the OVD apparatus of the present invention may solve the successive spiral deposition pattern problem of the optical fiber preform caused by the deposition density difference and the uneven deposition surface problem caused by the deposition amount difference, which commonly appeare in the conventional optical fiber preform deposition process.

In addition, the OVD apparatus of the present invention may prevent generation of inferior optical characteristics sensitive to the optical fiber core by restraining the outer surface unevenness of the optical fiber preform.

Furthermore, since the burner has the length substantially identical to the optical fiber preform, there is no need for reciprocation of the burner or the optical fiber preform in the OVD apparatus of the present invention. Thus, the OVD apparatus of the present invention may restrain fluctuation of the soot particles cause by the reciprocation of the burner or the optical fiber preform. In addition, it is also advantageous that the OVD apparatus may thereby remove a local difference of the soot density and reduce the loss at the ends of the finished optical fiber preform.

In addition, since there is not required a time for reciprocation of the burner or the optical fiber preform, the OVD apparatus of the present invention may dramatically reduce the time required for the deposition of the material particles of the optical fiber preform.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. An Outside Vapor Deposition (OVD) apparatus for making an optical fiber preform comprising:
    a mandrel having a predetermined length and capable of rotating; and
    a burner for emitting predetermined reaction gas together with combustion gas toward the mandrel to generate material particles of an optical fiber preform so that the material particles are deposited on a surface of the mandrel to form the optical fiber preform,
    wherein the burner has a length substantially equal to the mandrel, has an array of gas spreading channels successively connected to each other along the direction of the mandrel's central axis, and provides uniform temperature throughout the overall length of the mandrel at the same time,
    wherein a section of each channel becomes wider in the direction of the mandrel's central axis from a gas input portion to a gas output end portion, and
    wherein each gas spreading channel respectively emits the combustion gas together with the reaction gas.

2. An OVD apparatus according to claim 1, wherein a flame generated by the burner is substantially focused toward the central axis of the mandrel along the length of the mandrel.

3. An OVD apparatus according to claim 1, wherein each gas spreading channel is connected to different gas supply lines providing both the combustion gas and the reaction gas.

4. An OVD apparatus according to claim 1, wherein a filter is provided at the gas output portion of the gas spreading channel so as to disperse gas pressure in the gas spreading channel.

5. An OVD apparatus according to claim 4, wherein the filter has a pore size in the range of 50~150 μm.

6. An OVD apparatus according to claim 1, wherein the material particles include silica particles or germanium oxide.

* * * * *